United States Patent
Nyamekye et al.

(10) Patent No.: US 8,410,017 B2
(45) Date of Patent: Apr. 2, 2013

(54) FILTER AIDS MADE FROM LOW PERMEABILITY DIATOMITES

(75) Inventors: George Asante Nyamekye, Snowflake, AZ (US); Joseph Levay, LaGrande, OR (US); John Roulston, Lompoc, CA (US); John Menear, Goleta, CA (US)

(73) Assignee: Imerys Filtration Minerals, Inc., San Jose, CA (US)

( * ) Notice: Subject to any disclaimer, the term of this patent is extended or adjusted under 35 U.S.C. 154(b) by 339 days.

(21) Appl. No.: 12/743,830

(22) PCT Filed: Nov. 24, 2008

(86) PCT No.: PCT/US2008/084504
§ 371 (c)(1),
(2), (4) Date: May 20, 2010

(87) PCT Pub. No.: WO2009/067718
PCT Pub. Date: May 28, 2009

(65) Prior Publication Data
US 2010/0248953 A1   Sep. 30, 2010

Related U.S. Application Data

(60) Provisional application No. 60/989,941, filed on Nov. 25, 2007.

(51) Int. Cl.
*B01J 20/14* (2006.01)
(52) U.S. Cl. ......... 502/412; 502/411; 423/325; 423/326
(58) Field of Classification Search .................. 502/411, 502/412; 423/325, 326
See application file for complete search history.

(56) References Cited

U.S. PATENT DOCUMENTS

| | | | |
|---|---|---|---|
| 2,423,686 A | 7/1947 | Cummins | |
| 2,686,161 A | 8/1954 | Stewart | |
| 2,693,456 A | 11/1954 | Fennell | |
| 3,013,981 A | 12/1961 | Riede | |
| 4,142,968 A * | 3/1979 | Nielsen et al. | 502/412 |
| 4,325,844 A | 4/1982 | Olmsted, Jr. | |
| 4,581,338 A | 4/1986 | Robertson et al. | |
| 5,179,062 A | 1/1993 | Dufour | |
| 5,656,568 A | 8/1997 | Shiuh et al. | |
| 5,776,353 A * | 7/1998 | Palm et al. | 210/777 |
| 6,653,255 B2 | 11/2003 | Shiuh et al. | |

FOREIGN PATENT DOCUMENTS
WO    WO 2009/067718 A1    5/2009

OTHER PUBLICATIONS

International Search Report and Written Opinion from International Application No. PCT/US2008/084504 filed Nov. 24, 2008.

* cited by examiner

*Primary Examiner* — Stanley Silverman
*Assistant Examiner* — Diana J Liao
(74) *Attorney, Agent, or Firm* — Finnegan, Henderson, Farabow, Garrett & Dunner, L.L.P.

(57) ABSTRACT

Disclosed herein are diatomite filter aid products with enhanced permeabilities and flow characteristics, and methods for enhancing the permeabilities and flow characteristics of very fine grain, low permeability diatomite ore by, in one embodiment, pre-agglomerating the ore in the presence of less than 10% water and then subjecting the pre-agglomerated ore to at least one calcination process. At least one flux may be used in the at least one calcination process. Also disclosed herein is a method of processing diatomite ore suitable for samples with high wet densities or large amounts of fine particulate matter. Also disclosed herein are methods of producing commercially applicable filter aid products from Hungarian diatomite.

12 Claims, No Drawings

FILTER AIDS MADE FROM LOW PERMEABILITY DIATOMITES

CLAIM OF PRIORITY

This application is a U.S. national stage entry under 35 U.S.C. §371 from PCT International Application No. PCT/US2008/084504, filed Nov. 24, 2008, and claims priority to and the benefit of the filing date of U.S. Provisional Application No. 60/989,941, filed Nov. 25, 2007, the subject matter of both of which are incorporated herein by reference.

DESCRIPTION OF THE INVENTION

1. Field of the Invention

Disclosed herein are diatomite filter aid materials produced from fine grain, low permeability diatomite deposits. Also disclosed herein is a method of processing diatomaceous earth to produce diatomite filter aid products.

2. Background of the Invention

The present invention generally relates to diatomite products suitable for commercial filtration and separation that are produced from diatomite deposits with fine grain, low permeability diatoms.

In the field of fluid filtration, many methods of particle separation employ materials chosen from diatomite materials. Diatomite, also known as diatomaceous earth, is generally known as a sediment enriched in biogenic silica in the form of siliceous skeletal of diatoms—a diverse array of microscopic, single cell algae. Diatoms possess an ornate siliceous skeleton (e.g., frustules) of varied and intricate structure whose morphology may vary widely among species. Over 2,000 distinct species are known. The surface of diatoms is punctuated by a series of openings that comprise the complex fine structure of the frustules. The size of typical frustules may range from about 0.75 µm to about 1,000 µm.

The generally intricate and porous structure of diatomite may be particularly effective for the physical entrapment of particles in filtration processes. It is known to employ diatomite products to improve the clarity of fluids that contain suspended particles or particulate matter or have turbidity. The efficiency and usefulness of a diatomite product as a filter aid is generally related to its density when in contact with fluid during filtration. In most instances, a diatomite product with low density is desirable as it is more efficient. While the silica of diatomaceous earth or diatomite is predominantly of an amorphous type that may resemble mineral opal, crystalline quartz dust or sand is sometimes present which, although composed of silica, generally does not emulate the intricate and porous structure associated with diatomaceous earth or diatomite products.

Filtration components are generally produced in grades over a wide range of permeability ratings. As the permeability of the filtration component decreases, in general the ability of the filter aid material to remove small particles increases. The selection of filtration permeability for a specific filtration process depends in part on the flow rate and degree of fluid clarification required for a particular application. In many cases, the flow of fluid through a filter-aid material may be closely related to the nature of the filtration component's porosity.

Flow rates are related to permeability, which may be reported in units of darcies ("Da"). One darcy corresponds to the permeability through a filter medium 1 cm thick allowing 1 cm$^2$ of fluid with a viscosity of 1 centipoise to pass through an area of 1 cm$^2$ in 1 second under a pressure differential of 1 atm. Permeability may, for example, be determined using a device designed to form a filter cake on a septum from a suspension of filter-aid material in water and then measuring the time required for a specified volume of water to flow through a measured thickness of filter cake of known cross-sectional area. Many filtration media suitable for micro filtration, such as diatomite, are commercially available and span a wide range of permeability, ranging from about 0.001 Da to over 30 Da.

As used herein, "wet density" is an indicator of a material's porosity. For example, wet density reflects the void volume available to entrap particulate matter in a filtration process and, consequently, wet density may be used to determine filtration efficiency. Thus, filtration components with lower wet density may result in products with greater porosity, and thus perhaps greater filtration efficiency.

Certain diatomite deposits have low permeability and high wet densities, properties that have been heretofore unattractive for commercial filtration applications. The diatomite deposits in Erdobenye, Hungary, for example, have wet densities in the range of about 28 to 33 lb/ft$^3$. Further, these deposits have very fine particle sizes, with initial $d_{10}$ from about 2 to 10 microns and permeability less than about 0.010 Da.

Though there have been previous attempts to improve the properties of certain diatomite deposits with generally unattractive properties for commercial filtration applications, none have disclosed the processing of fine grain, low permeability diatomite deposits to produce highly permeable filter aid products suitable for both slow and fast filter grade products. U.S. Pat. No. 2,686,161 may disclose a method of improving the properties of certain diatomite deposits to produce filter aid products; however, particles smaller than 20 microns are lost during processing, which makes the process unsuitable for processing diatomite deposits with large amounts of very fine particles. U.S. Pat. Nos. 3,013,981 and 4,325,844, appear to disclose pre-agglomeration to produce diatomite filter aid products, but those references teach using large amounts of water to plasticize diatomite materials with relatively low starting wet densities. While U.S. Pat. No. 4,325,844 appears to disclose the processing of very fine grain diatomite, it is mostly concerned with reducing calcination time and saving energy, and does not disclose improving the characteristics of filter aid products from low permeability diatomite deposits.

Accordingly, it is one object of the inventions disclosed herein to improve the properties of low permeability, dense, fine grain diatomite, so that it may be used in commercial filter aid applications. It is a further object of the inventions disclosed herein to provide a method of pre-agglomeration that is suitable for highly dense diatomite ore. In particular, the inventors surprisingly found that pre-agglomeration of high wet density, low permeability diatomite, followed by conventional calcination processes, produced processed diatomite material with significantly and unexpectedly lower wet density and higher permeability.

SUMMARY OF THE INVENTION

Disclosed herein are diatomite filter aid products with enhanced permeabilities and flow characteristics, and methods for enhancing the permeabilities and flow characteristics of very fine grain low permeability diatomite ore by, in one embodiment, pre-agglomerating the ore in the presence of less than 10% water and then calcining the resultant product. Also disclosed herein are methods of producing commercially applicable filter aid products from Hungarian diatomite.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE EMBODIMENTS

Reference will now be made in detail to the present embodiments of the invention. In one embodiment, at least one diatomite ore, or feed material, having wet density greater than about 25 lb/ft³ and $D_{50}$ less than about 20 microns is prepared for feeding into a flux calciner or calciner, pre-agglomerated with less than about 10% water, and calcined to form a filter aid product. In another embodiment, the at least one diatomite feed material is flux calcined. In a further embodiment, the at least one diatomite feed material is passed through a screen after agglomeration. In yet another embodiment, the diatomite product is treated with water.

Feed Material

The filter aid products disclosed herein comprise at least one feed material, or at least one diatomite ore, with a high wet density, a fine particle size, and/or low permeability. In one embodiment, the at least one feed material is diatomite. In another embodiment, the at least one feed material is diatomite from or near deposits in Erdobenye, Hungary. In a further embodiment, the at least one feed material is any porous material with a wet density from about 28 to about 33 lb/ft³. In yet another embodiment, the at least one feed material is any porous material with an initial $d_{10}$ from about 2 to about 10 microns. In yet a further embodiment, the at least one feed material is any porous material with a permeability less than about 0.010 Da.

The at least one feed material may have a wet density greater than about 25 lb/ft³. In one embodiment, the wet density is greater than about 28 lb/ft³. In another embodiment, the wet density is greater than about 32 lb/ft³. In a further embodiment, the wet density is from about 25 lb/ft³ to about 50 lb/ft³.

The at least one feed material may be characterized by a $D_{10}$ value, defined as the size at which 10 percent of the diatomite particle volume is accounted for by particles having a diameter less than or equal to the stated value. In one embodiment, the at least one feed material has $D_{10}$ less than about 6 microns. In another embodiment, the $D_{10}$ is less than about 5 microns. In a further embodiment, the $D_{10}$ is from about 3 to about 5 microns.

The at least one feed material may be characterized by a $D_{50}$ value, defined as the size at which 50 percent of the particle volume is accounted for by particles having a diameter less than or equal to the stated value. In one embodiment, at least one feed material has a $D_{50}$ less than about 20 microns. In another embodiment, the $D_{50}$ is less than about 15 microns. In a further embodiment, the $D_{50}$ is less than about 14 microns. In yet another embodiment, the $D_{50}$ is from about 10 to about 20 microns.

The at least one feed material may be characterized by a $D_{90}$ value, defined as the size at which 90 percent of the particle volume is accounted for by particles having a diameter less than or equal to the stated value. In one embodiment, the at least one feed material has a $D_{90}$ less than about 50 microns. In another embodiment, the $D_{90}$ is less than about 45 microns. In a further embodiment, the $D_{90}$ is from about 35 to about 50 microns.

Particle size measurements, such as those for $D_{10}$, $D_{50}$, and $D_{90}$ determinations, may be carried out by any means now or hereafter known to those of ordinary skill in the art. For example, particle size measurements made be carried out using standard techniques on a Microtrac X100 Particle Size Analyzer.

The at least one feed material maybe characterized by permeability. In one embodiment, the permeability of the at least one feed material is less than about 0.150 Da. In another embodiment, the permeability is less than about 0.100 Da. In a further embodiment, the permeability is less than about 0.050 Da. In yet another embodiment, the permeability is less than about 0.010 Da. In yet a further embodiment, the permeability is less than about 0.005 Da. In still another embodiment, the permeability is from about 0.001 to about 0.150 Da.

The at least one feed material may be classified by its chemical composition. In one embodiment, the at least one feed material has an $SiO_2$ composition of about 89 to about 95%. In another embodiment, the $SiO_2$ composition is from about 94 to about 95%. In a further embodiment, the $SiO_2$ composition is from about 93 to about 94%. In yet another embodiment, the $SiO_2$ composition is from about 92 to about 93%. In still another embodiment, the $SiO_2$ composition is from about 91 to about 92%. In still a further embodiment, the $SiO_2$ composition is from about 90 to about 91%.

In one embodiment, the at least feed material has an $Al_2O_3$ composition from about 2 to about 4%. In another embodiment, the $Al_2O_3$ composition is from about 2 to about 3%. In a further embodiment, the $Al_2O_3$ composition is from about 3 to about 4%.

In one embodiment, the at least one feed material has an $Fe_2O_3$ composition from about 0.6 to about 3%. In another embodiment, the $Fe_2O_3$ composition is from about 0.6 to about 1.0%. In a further embodiment, the $Fe_2O_3$ composition is from about 1 to about 2%. In yet another embodiment, the $Fe_2O_3$ composition is from about 2 to about 3%.

In one embodiment, the at least one feed material has properties of about those listed in Table 1. $\alpha T$ is the alpha time measured in seconds and represents the period of time for a specified volume of liquid to flow through a known amount of filter cake. $\alpha R$ is the alpha rate, measured in $\sec^{-1}$ and is calculated by the following equation:

$$\alpha R = \alpha \text{ factor}/\alpha T$$

TABLE 1

| Feed Material | AT (sec) | AR (1/sec) | WD (lb/ft³) | Perm. (mD) | $D_{10}$ (μm) | $D_{50}$ (μm) | $D_{90}$ (μm) | $SiO_2$ | $Al_2O_3$ | $Fe_2O_3$ | CaO |
|---|---|---|---|---|---|---|---|---|---|---|---|
| 1 | 304.1 | 0.6 | 28.4 | 9.6 | 5.1 | 14.5 | 46.0 | 93.16 | 3.61 | 1.49 | 0.65 |
| 2 | 642.6 | 0.3 | 32.8 | 3.9 | 4.6 | 13.7 | 41.4 | 93.16 | 3.72 | 1.69 | 0.49 |
| 3 | 1011.1 | 0.2 | 31.5 | 2.6 | 4.2 | 12.1 | 40.3 | 85.10 | 8.72 | 2.68 | 1.23 |

Generally accurate measurements of total silica content can be determined by using X-ray fluorescence spectrometry (XRF). This technique is also useful to determine the total content of other elements, such as aluminum, iron, and sodium. In one particular embodiment of a "pressed binder matrix" X-ray fluorescence method, a 3 g diatomite sample is roasted at 950° C. for 1 hour and then added to 0.75 g of SPECTROBLEND™ binder. That mixture is milled by shaking for 5 minutes in a tungsten carbide mixing vial with an impact ball. The milled mixture is then pressed in a 31 mm die to 24,000 pounds per square inch (165 MPa) to form a pellet. The pressed composition is then analyzed by using a Spectrace 6000 energy-dispersive XRF spectrometer with standard operating parameters, calibrated using six diatomite standards prepared in the same manner as the samples. The Spectrace instrument employs an electronically cooled Li(Si) detector and a 50 kV rhodium target x-ray source, and is configured to result in sample excitation with approximately 50% dead-time. Peak intensities from spectra are analyzed by lineshape analysis comparison with single element reference spectra. Specifically, the $K_\alpha$ peak intensities used for silicon, aluminum and iron determinations correspond to energies of 1.740 keV, 1.487 keV, and 6.403 keV, respectively. The peak intensities for the diatomite standards are then converted into pure element count rates, which are used for determining element contents in samples, by peak intensity and data fitting.

Feed Preparation

The at least one feed material is prepared for feeding into a calciner. In one embodiment, the at least one feed material is prepared for feeding by drying. In another embodiment, the at least one feed material is prepared for feeding by drying and crushing. In a further embodiment, the at least one feed material is prepared for feeding by drying and milling. In yet another embodiment, the at least one feed material is prepared for feeding by drying, crushing, and milling.

As part of preparation for feeding, the at least one feed material may be dried to varying percentages of water. In one embodiment, the at least one feed material is dried to less than or equal to about 6% by weight water. In another embodiment, the at least one feed material is dried to less than about 5% by weight water. In a further embodiment, the at least one feed material is dried to less than about 3% by weight water. In yet another embodiment, the at least one feed material is dried to less than about 1% by weight water. In yet a further embodiment, the at least one feed material is dried to from about 0.1 to about 6% water.

As an optional additional part of preparation for feeding, the at least one feed material may be classified to remove impurities. Any classification technique now or hereafter known to the ordinarily skilled artisan may be used. In one embodiment, the classification is performed with a Gruendler classifier. In another embodiment, classification removes at least one heavy metal impurity from the at least one feed material.

Pre-Agglomeration

According to the inventions described herein, the prepared at least one feed material may be pre-agglomerated by evenly distributing about 3 to about 10 weight percent water onto the surface of well-dispersed particles of the at least one feed material, and mixing the water with the at least one feed material. In one embodiment, the water is distributed by spraying in a fine mist. In another embodiment, the water is mixed with the at least one diatomite feed material by use of a high speed pin mixer. In a further embodiment, the water is distributed and mixed by simultaneously adding water and the at least one prepared feed material into a high speed pin mixer, the pins of which are rotating at from about 400 to about 1800 rpm.

The amount of water added to the at least one feed material may vary according to one or more of factors, including the at least one feed material chosen and the desired calcination technique to be used. In one embodiment, the amount of water added to the at least one feed material is about 3 to about 9 percent by weight of the at least one feed material. In another embodiment, the amount of water added is about 3 to about 8 percent by weight. In a further embodiment, the amount of water added is about 3 to about 6 percent by weight. In yet another embodiment, the amount of water added is about 3 to about 5 percent by weight. In yet a further embodiment, the amount of water added is about 3 to about 4 percent by weight. In still another embodiment, the water added does not plasticize the at least one feed material.

Optional Screening

In one embodiment, the pre-agglomerated at least one feed material is dispersed or brushed through at least one screen. In another embodiment, the pre-agglomerated at least one feed material is introduced into at least one centrifugal screener device. In a further embodiment, the pre-agglomerated at least one feed material is introduced into a centrifugal screener device with screen openings from about 500 to about 1410 microns. In embodiments using centrifugal screener devices, the centrifugal action of the screener forces the wetted material through the screen openings to form extruded particles. The net effect of screening is generally the transformation of a small and variable particle size to a uniform particle size approximately equal to the screen size opening.

In an alternative embodiment, the final calcined feed product is dispersed or brushed through at least one screen. In one such embodiment, the material is brushed through a screen with openings from about 150 to about 180 microns.

Calcination

The pre-agglomerated at least one feed material is subjected to at least one calcination process. Various calcining conditions and methods are known and may be hereafter discovered. Those conditions and methods may be varied according to the inventions described herein to yield a desired degree of sintering and agglomeration of calcined feed product to achieve a particular desired product flow rate. In one embodiment, many of the pre-agglomerated at least one feed material particles are maintained during the at least one calcination process, thus minimizing the amount of fines material in the kiln discharge.

The at least one calcination process may be effected over a range of temperatures. In one embodiment, the calcining temperature is from about 1500° F. to about 2200° F. In another embodiment, the calcining temperature is from about 2000° F. to about 2200° F. In a further embodiment, the calcining temperature is from about 1900° F. to about 2000° F. In yet another embodiment, the calcining temperature is from about 1800° F. to about 1900° F. In yet a further embodiment, the calcining temperature is from about 1500° F. to about 1900° F.

The at least one calcination process may be effected over a range of time. The time for the at least one calcination process may depend on various factors, including but not limited to, the identity and quality of the pre-agglomerated at least one feed material and the equipment used for the at least one calcination process. In one embodiment, the calcining time is from about 600 seconds to about 2400 seconds. In another embodiment, the calcining time is from about 1000 seconds to about 2000 seconds. In a further embodiment, the calcining time is about 1800 seconds.

The at least one calcination process may be carried out by any means now known to the skilled artisan or hereafter discovered. In one embodiment, calcining is performed by indirect rotary kiln firing. In another embodiment, calcining is performed by direct rotary kiln firing. In a further embodiment, calcining is performed by traveling grate. In yet another embodiment, calcining is performed by muffle calcination. In yet a further embodiment, calcining is performed by open hearth calcination.

The at least one calcination process may be carried out in the presence of at least one fluxing agent, to yield a flux-calcined product. The conditions and methods described above for the at least one calcination process may also be suitable for at least one calcination process comprising at least one fluxing agent. The presence of at least one fluxing agent during the at least one calcination process may reduce the temperature at which sintering and/or agglomeration of the pre-agglomerated at least one feed material occurs, thus permitting larger agglomerates to form and extending the permeability range of the resultant filter aids.

Suitable agents as the at least one fluxing agent are any now known to those skilled in the art or which may hereafter be discovered. In one embodiment, the at least one fluxing agent is sodium carbonate (soda ash, $Na_2CO_3$). In another embodiment, the at least one fluxing agent is sodium hydroxide (NaOH). In a further embodiment, the at least one fluxing agent is sodium chloride (NaCl). In yet another embodiment, the at least one fluxing agent is potassium carbonate ($K_2CO_3$). In yet a further embodiment, the at least one fluxing agent is sodium borate ($Na_2B_4O_7$).

In one embodiment, the at least one fluxing agent is at least one salt of at least one alkali metal in Group IA. In another embodiment, the at least one fluxing agent is at least one salt of at least one alkali metal. In a further embodiment, the at least one alkali metal is sodium. In yet another embodiment, the at least one alkali metal is chosen from alkali metals having a larger atomic radius than that of sodium. In yet a further embodiment, the at least one alkali metal is potassium. In still another embodiment, the at least one alkali metal is rubidium.

The at least one fluxing agent may be added to the pre-agglomerated at least one feed material at various times relative to the at least one calcination process. In one embodiment, the at least one fluxing agent is added prior to the at least one calcination process. In another embodiment, the at least one fluxing agent is added concurrently with the water during pre-agglomeration. In a further embodiment, the at least one fluxing agent is added during the at least one calcination process. In yet another embodiment, the at least one fluxing agent is added prior to and during the at least one calcination process.

The at least one fluxing agent may be added to the pre-agglomerated at least one feed material in amounts readily determinable by the skilled artisan. In one embodiment, less than about 8% of the at least one fluxing agent is added. In another embodiment, less than about 7% fluxing agent is added. In a further embodiment, less than about 6% is added. In yet another embodiment, less than about 5% is added. In yet a further embodiment, less than about 4% is added. In still another embodiment, less than about 3% is added. In still a further embodiment, less than about 2% is added. In another embodiment, from about 0.5% to about 10% fluxing agent is added.

In some embodiments where the material is flux-calcined, the at least one fluxing agent may undergo a chemical decomposition reaction. In one embodiment of such a chemical decomposition, at least one fluxing agent containing sodium bonds with diatom silica present in the at least one feed material to form sodium silicate, expelling carbon dioxide gas in the process. In another embodiment, at least one fluxing agent containing at least one alkaline metal bonds with diatom silica present in the at least one feed material to form at least one alkaline metal silicate.

Optional Water Treatment

The calcined product may be treated with water to reduce the "Beer Soluble Iron" (BSI) levels. In general, conventional diatomite products may be used to filter liquids, for example, beer. Contamination of the filtered beer with metals, such as iron, is a key concern. Consequently, the content of iron-containing materials in the conventional diatomite product that are soluble in beer (e.g., beer-soluble iron) provide a useful indicator of the degree to which contamination by these impurities occurs. Diatomite typically contains various inorganic compounds such as calcium and iron compounds. The most common type of iron compound found in diatomite is $Fe_2O_3$. The level of soda ash used may be a significant factor in determining the BSI level of the diatomite product. High BSI products are usually generated as the soda ash content increases. Water treatment of the material generally reduces the iron solubility and results in lower BSIs. In one embodiment, water treatment is carried out by injecting a generally uniform spray of water into the calcined product and keeping it at a temperature of about from about 170° F. to about 200° F. for a minimum period of about 30 minutes in an enclosed vessel.

Other Optional Treatments

Fines may be removed from the product to increase permeability. In one embodiment, the fines particles below about 17 microns are removed from the product by air classification. In another embodiment, the fines particles below about 17 microns are removed from the product by mechanical classification.

Characteristics of the Calcined Product

The calcined product may possess physical and chemical properties rendering it suitable for both slow and fast grade filter aid products. Filter aid products such as diatomites are generally processed to provide a range of filtration rates, which are related to their permeability. The selection of the filtration permeability for a specific filtration process may depend, in part, on the flow rate and degree of fluid clarification desired for the particular application. The present disclosure may provide calcined filter aid products suitable for both high flow and low flow filtration applications. In one embodiment, the calcined product has a permeability ranging from about 0.05 to about 0.6 Da, which is generally suitable for low flow filtration applications. In another embodiment, the calcined product has a permeability ranging from about 0.6 to about 6.0 Da, which is generally suitable for high flow filtration applications. In a further embodiment, the calcined product has a permeability ranging from about 0.2 to about 0.6 Da. In yet another embodiment, the calcined product has a permeability ranging from about 0.05 to about 0.2 Da. In yet a further embodiment, the calcined product has a permeability ranging from about 0.05 to about 0.6 Da. In still another embodiment, the calcined product has a permeability ranging from about 0.6 to about 6.0 Da.

As a result of the process described herein, the calcined product may have an increased permeability versus the starting at least one feed material. In one embodiment, the permeability of the calcined product increases about 50% compared to the starting at least one feed material. In another embodiment, the permeability increases up to about 80%. In a further embodiment, the permeability increases up to about 100%. In yet another embodiment, the permeability increases up to about 200%.

As a result of the process described herein, the calcined product may have a decreased wet density versus the starting at least one feed material. In one embodiment, the wet density is reduced by up to about 50%. In another embodiment, the wet density is reduced by up to about 40%. In a further embodiment, the wet density is reduced by up to about 30%. In yet another embodiment, the wet density is reduced by up to about 20%. The wet density of the calcined product itself may be measured. In one embodiment, the calcined product has a wet density of less than about 22 lb/ft$^3$. In another embodiment, the calcined product has a wet density of less than about 20 lb/ft$^3$. In a further embodiment, the calcined product has a wet density of less than about 19 lb/ft$^3$. In yet another embodiment, the calcined product has a wet density of from about 15 lb/ft$^3$ to about 25 lb/ft$^3$.

As a result of the process described herein, the calcined product may have an increased particle size versus the starting at least one feed material. In one embodiment, the $D_{50}$ of the calcined product is from about 500 to about 1410 microns. In another embodiment, the $D_{50}$ is from about 200 to about 600 microns. In a further another embodiment, the $D_{50}$ is from about 60 to about 80 microns. In yet another embodiment, the $D_{50}$ is from about 80 to about 500 microns. In yet a further embodiment, the particles comprising the calcined product average about 1.41 mm in size.

The calcined product may be characterized by its beer soluble iron content. In one embodiment, the calcined product has beer soluble iron content of less than about 25 ppm. In another embodiment, the calcined product has beer soluble iron content of less than about 20 ppm. In a further embodiment, the calcined product has beer soluble iron content of less than about 15 ppm. In yet another further embodiment, the calcined product has beer soluble iron content of less than about 35 ppm.

In one embodiment, beer soluble iron may be measured by the following test method. 5.0 g of the diatomite product sample is added to 200 g of room temperature beer that has been de-carbonated in a flask. The content is swirled each minute for a period of 5 minutes to keep the solids in suspension. The content is swirled one more time just before the sixth minute and then poured into a funnel fitting with a Reeve Angel 802 folded filter paper. The filtrate from the first 30 seconds is discarded and the filtrate is collected for the next 150 seconds. The total contact time is 9 minutes. Two 25 mL aliquots of the filtrate are measured into test tubes, one serving as the blank and the other as the test sample. 1 mL of 0.3% phenathroline solution and approximately 0.01 g of ascorbic acid powder are added to the filtrate in the test sample. The sample color is allowed to develop for at least 15 minutes but not more than 45 minutes. The absorbance of the test sample is read using a spectrophotometer at 505 nm after the blank has been zeroed. The Beer Soluble Iron content (ppm) is obtained by multiplying the Absorbance reading by 105.

EXAMPLES

Several calcined filter-aid products comprising at least one component produced from fine grain low permeability diatomite deposits, as well as methods for preparing them, are described in the following examples, which are offered by way of illustration and not limitation.

Example 1

Samples of feed material of diatomite, originating from Erdobeyne, Hungary, and having the properties listed in Table 1 as Feed Material 2, were dried and milled. The samples were passed through a Gruendler classifier to separate heavy metal impurities. Some samples were then pre-agglomerated by subjecting to a fine mist of 6% water by weight of each total sample to the dried and milled powder, following by thorough mixing. Muffle calcinations were then carried out on both the pre-agglomerated and non-pre-agglomerated materials. The calcining time was fixed at 30 minutes, and the temperature was varied during that time from 1800° F. to 2000° F. on various samples. The calcining was performed in the presence of a soda ash flux ranging from 0% to 5%. The samples of flux-calcined and calcined products were screened by brushing through a 150 micron screen. The BSI levels were measured using the method previously described both before and after a post-calcination water treatment. The physical and chemical characteristics of the resulting products are depicted in Table 2.

TABLE 2

| Calc. Temp. (° F.) | Soda Ash (%) | Physical Properties | | | | Particle Size (minus 100 mesh) | | | | Beer Soluble Iron Content | |
|---|---|---|---|---|---|---|---|---|---|---|---|
| | | αT (sec) | αR (sec$^{-1}$) | WD (lb/ft$^3$) | Perm. (mD) | D10 (μm) | D50 (μm) | D90 (μm) | +150M (%) | Before Water (ppm) | After Water (ppm) |
| PRODUCTS FROM CONVENTIONAL FEED MATERIALS | | | | | | | | | | | |
| 1800 | 2.0 | 36.3 | 5.0 | 25.0 | 90 | | | | | 41 | 24 |
| 1800 | 3.0 | 140.0 | 8.1 | 20.8 | 172 | | | | | 58 | 25 |
| 1800 | 5.0 | 77.2 | 14.6 | 19.5 | 330 | | | | | 70 | 15 |
| 1900 | 0.0 | 46.5 | 3.9 | 21.5 | 81 | | | | | 14 | 13 |
| 1900 | 1.0 | 133.9 | 8.4 | 20.8 | 180 | | | | | 15 | 20 |
| 1900 | 2.0 | 93.0 | 12.1 | 22.3 | 243 | | | | | 17 | 21 |
| 2000 | 0.0 | 32.6 | 5.6 | 20.8 | 119 | | | | | 17 | 11 |
| 2000 | 1.0 | 87.5 | 12.9 | 20.8 | 275 | | | | | 17 | 17 |
| 2000 | 2.0 | 73.5 | 15.3 | 23.1 | 297 | | | | | 23 | 23 |
| 2000 | 4.0 | 48.4 | 23.3 | 19.5 | 527 | | | | | 112 | 34 |
| PRODUCTS FROM AGGLOMERATED FEED MATERIALS (In Accordance with the Present Inventions) | | | | | | | | | | | |
| 1900 | 0.0 | 146 | 7.7 | 18.9 | 180 | 6.6 | 20.6 | 85.7 | 6.1 | 15 | 14 |
| 2000 | 1.0 | 65.1 | 17.3 | 20.1 | 381 | 7.2 | 25.2 | 101.2 | 9.1 | 20 | 20 |
| 2000 | 2.0 | 44.3 | 25.5 | 20.1 | 560 | 7.6 | 26.3 | 99.4 | 8.5 | 22 | 21 |

As used herein, "minus 100 mesh" means the calcined product from the agglomerated feed was dispersed through a 100 mesh screen, or the % of the product retained on 150 microns. Table 2 also reports the % of the product retained on a 150 mesh screen ("+150M"), or the % retained on 104 microns. As used herein, "conventional feed" is meant to indicate samples that were not agglomerated or pre-agglomerated in accordance with the present inventions.

As shown in Table 2, the samples that were pre-agglomerated surprisingly and unexpectedly had lower wet densities and much higher permeabilities than the conventional feed materials processed under the same conditions. The conventional feed product calcined at a temperature of 1900° F. and with no fluxing agent had a wet density of 21.5 lb/ft³ and a permeability of 0.081 Da; under the same conditions, the pre-agglomerated sample had a reduced wet density of 18.9 lb/ft³ and an increased permeability of 0.180 Da. At a temperature of 2000° F. and in the presence of 1.0% fluxing agent, the conventional feed product had a wet density of 20.8 lb/ft³ and a permeability of 0.275 Da; under the same conditions, the pre-agglomerated product had a reduced wet density of 20.1 lb/ft³ and an increased permeability of 0.381 Da. At 2000° F. and in the presence of 2.0% fluxing agent, the pre-agglomerated sample had a wet density of 23.1 lb/ft³ and a permeability of 0.297 Da; under the same conditions, the pre-agglomerated product had a reduced wet density of 20.1 lb/ft³ and an increased permeability of 0.560 Da.

Example 2

Samples of feed material of diatomite, originating from Erdobeyne, Hungary and having the properties listed in Table 1 as Feed Material 1, were dried and milled. Some samples were then pre-agglomerated as described in Example 1. The samples were calcined as described in Example 1 and screened by brushing through a 180 micron screen. The BSI levels were measured both before and after water treatment. The physical and chemical characteristics of the resulting product are depicted in Table 3.

As used herein, "minus 80 mesh" means the calcined product from the agglomerated feed was dispersed through an 80 mesh screen, or the % of the product retained on 177 microns. As used herein, "minus 60 mesh" means the calcined product from the agglomerated feed was dispersed through a 60 mesh screen, or the % of the product retained on 250 microns. Table 3 also reports the % of the product retained on a 150 mesh screen ("+150M"), or the % retained on 104 microns.

As reflected in Table 3, the products from the pre-agglomerated feeds surprisingly and unexpectedly had much lower wet densities and much higher permeabilities than the products from the conventional feeds. The conventional feed product calcined at 2000° F. in the presence of 5% fluxing agent had a wet density of 18.4 lb/ft³ and a permeability of 1.46 Da; under the same conditions, the pre-agglomerated product had a reduced wet density of 16.9 lb/ft³ and an increased permeability of 2.68 Da. The conventional feed product calcined in the presence of 8% fluxing agent had a wet density of 17.8 lb/ft³ and a permeability of 2.70 Da; at the same temperature and in the presence of 7% fluxing agent, the wet density of the comparable pre-agglomerated product was reduced to 16.9 lb/ft³ and the permeability increased to 5.92 Da.

Unless otherwise indicated to the contrary, all numbers expressing quantities of ingredients, reaction conditions, and so forth used in the specification, including claims, are to be understood as being modified in all instances by the term "about." Accordingly, unless indicated to the contrary, the numerical parameters set forth in the specification and attached claims are approximations that may very depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting for the broad scope of the invention are approximations, unless otherwise indicated the numerical values set forth in the specific examples are reported as precisely as possible. Any numerical value, however, inherently contains certain errors necessarily resulting from the standard deviation found in their respective testing measurements. The section headings used in this disclosure are provided merely for

TABLE 3

| Calc. Temp. (° F.) | Soda Ash (%) | αT (sec) | αR (sec⁻¹) | WD (lb/ft³) | Perm. (mD) | D10 (μm) | D50 (μm) | D90 (μm) | +150M (%) | Beer Soluble Iron Content Before Water (ppm) | After Water (ppm) |
|---|---|---|---|---|---|---|---|---|---|---|---|
| PRODUCTS FROM CONVENTIONAL FEED MATERIALS | | | | | | | | | | | |
| | | | | | | (minus 80 mesh) | | | | | |
| 1900 | 6.0 | 95.6 | 50.2 | 18.4 | 1.20 | 10.8 | 46.3 | 120.8 | 15.2 | 90 | 11 |
| 2000 | 5.0 | 78.1 | 61.5 | 18.4 | 1.46 | 15.2 | 58.1 | 115.3 | 14.0 | 95 | 14 |
| 2000 | 8.0 | 43.7 | 109.8 | 17.8 | 2.70 | — | — | — | — | 74 | 9 |
| PRODUCTS FROM AGGLOMERATED FEED MATERIALS (In Accordance with the Present Inventions) | | | | | | | | | | | |
| | | | | | | (minus 60 mesh) | | | | | |
| 2000 | 5 | 23.0 | 208.7 | 16.0 | 5.63 | 19.3 | 69.9 | 145.1 | 24.8 | 49 | 17 |
| | | | | | | (minus 80 mesh) | | | | | |
| 2000 | 5 | 46.0 | 104.3 | 16.9 | 2.68 | 14.9 | 60.3 | 132.4 | 20.0 | 93 | 13 |
| 2000 | 7 | 21.4 | 224.3 | 16.4 | 5.92 | 22.0 | 77.4 | 149.1 | 29.1 | 82 | 11 |

What is claimed is:

1. A method for preparing a diatomite filter aid product comprising:
   a. providing at least one diatomite feed material having a wet density greater than about 25 lb/ft$^3$ and a permeability less than about 0.010 Da;
   b. pre-agglomerating the at least one diatomite feed material with from about 3 to about 10% water to produce a pre-agglomerated diatomite, the pre-agglomerated diatomite being particulate; and,
   c. calcining the pre-agglomerated diatomite,
   wherein the calcined diatomite has a wet density less than about 25 lb/ft$^3$ and a permeability greater than about 0.050 Da.

2. The method of claim 1, further comprising passing the pre-agglomerated diatomite through at least one screen.

3. The method of claim 1, wherein the pre-agglomerated diatomite is calcined in the presence of at least one fluxing agent.

4. The method of claim 3, wherein the at least one fluxing agent is soda ash.

5. The method of claim 3, wherein the at least one fluxing agent is present in an amount of less than about 10%.

6. The method of claim 1, wherein from about 3 to about 6% water relative to the weight of the feed material is added to the at least one diatomite feed material during pre-agglomerating.

7. The method of claim 1, further comprising treating the calcined pre-agglomerated diatomite with water.

8. The method of claim 2, wherein the openings of the at least one screen are from about 150 to about 1410 microns.

9. The method of claim 8, wherein the openings of the at least one screen are from about 500 to about 1410 microns.

10. The method of claim 1, wherein the at least one diatomite feed material has a wet density greater than about 28 lb/ft$^3$.

11. The method of claim 1, wherein the calcined diatomite has a wet density less than about 22 lb/ft$^3$.

12. The method of claim 1, wherein the calcined diatomite has a Beer Soluble Iron content of less than about 35 ppm.

* * * * *